April 3, 1928.  1,665,099
S. F. KIESLING ET AL
WORK HOLDER FOR PRINTING AND EMBOSSING MACHINES
Filed Aug. 2, 1926  2 Sheets-Sheet 2
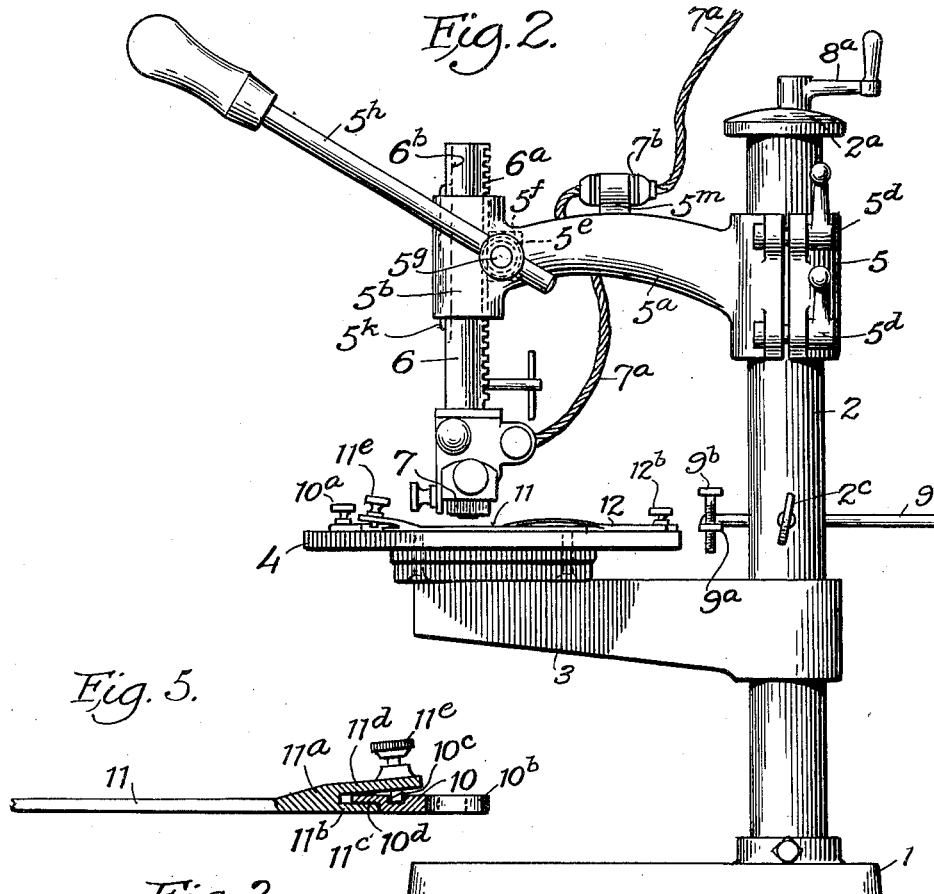
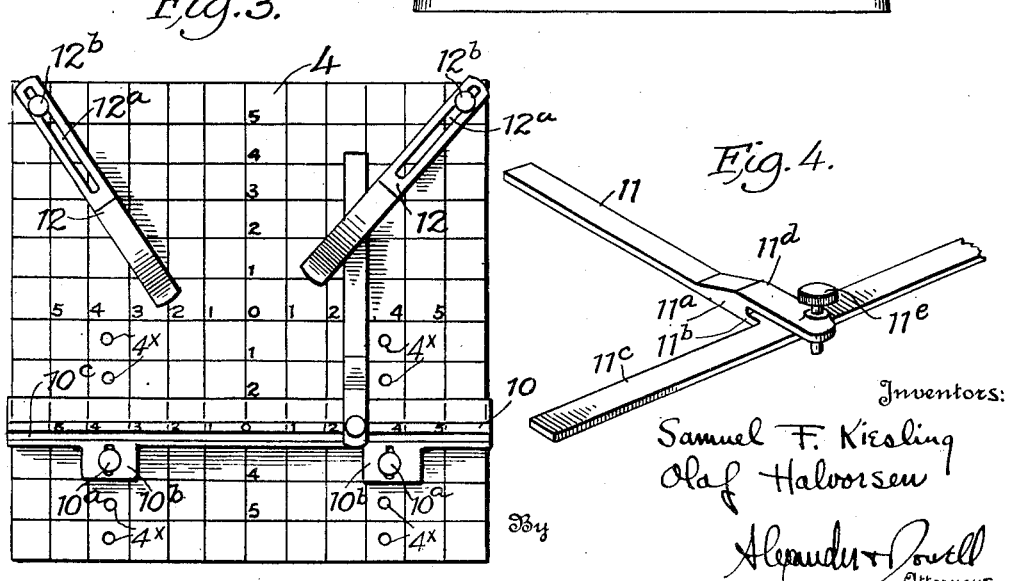

Patented Apr. 3, 1928.

1,665,099

UNITED STATES PATENT OFFICE.

SAMUEL F. KIESLING AND OLAF HALVORSEN, OF CHICAGO, ILLINOIS.

WORK HOLDER FOR PRINTING AND EMBOSSING MACHINES.

Application filed August 2, 1926. Serial No. 126,474.

This invention is a novel improvement in work holders for machines for embossing or printing on various types of goods, and more particularly to machines specifically designed for printing or embossing leather goods such as shown in Letters Patent #1,452,421, issued April 17, 1923 to Olaf Halvorsen and Albion H. Johnson, conjointly, the former being one of the joint inventors in the present application.

The principal object of our invention is to provide a novel work holder including a gauge board for squaring up the "work" and holding same in proper relation to the printing die of such machine, said gauge board having novel spring clamps or holders thereon for holding down the "work" upon the gauge board, and also having a novel scale bar with an adjustable arm extending at right angles to the scale bar, whereby when the scale bar and arm have been properly "set" on the gauge board, articles of the same size and shape when successively placed on the gauge board with adjacent corners touching the scale bar and arm, may each receive an impression from the die in the same relative location.

Other minor objects of the invention will be hereinafter set forth.

We will explain the invention with reference to the accompanying drawings which illustrate one practical embodiment thereof, to enable others familiar with the art to adopt and use the same, and we will summarize in the claims the novel features of construction, and novel combinations of parts, for which protection is desired.

In said drawings:—

Fig. 2 is a side elevation of the machine shown in Fig. 1.

Fig. 3 is a plan view of the work holder detached from the machine, and showing the scale bar and spring clamps applied thereto.

Fig. 4 is a perspective view of the adjustable arm of the scale bar, detached.

Fig. 5 is a transverse section through the scale bar and adjustable arm.

Figure 1:
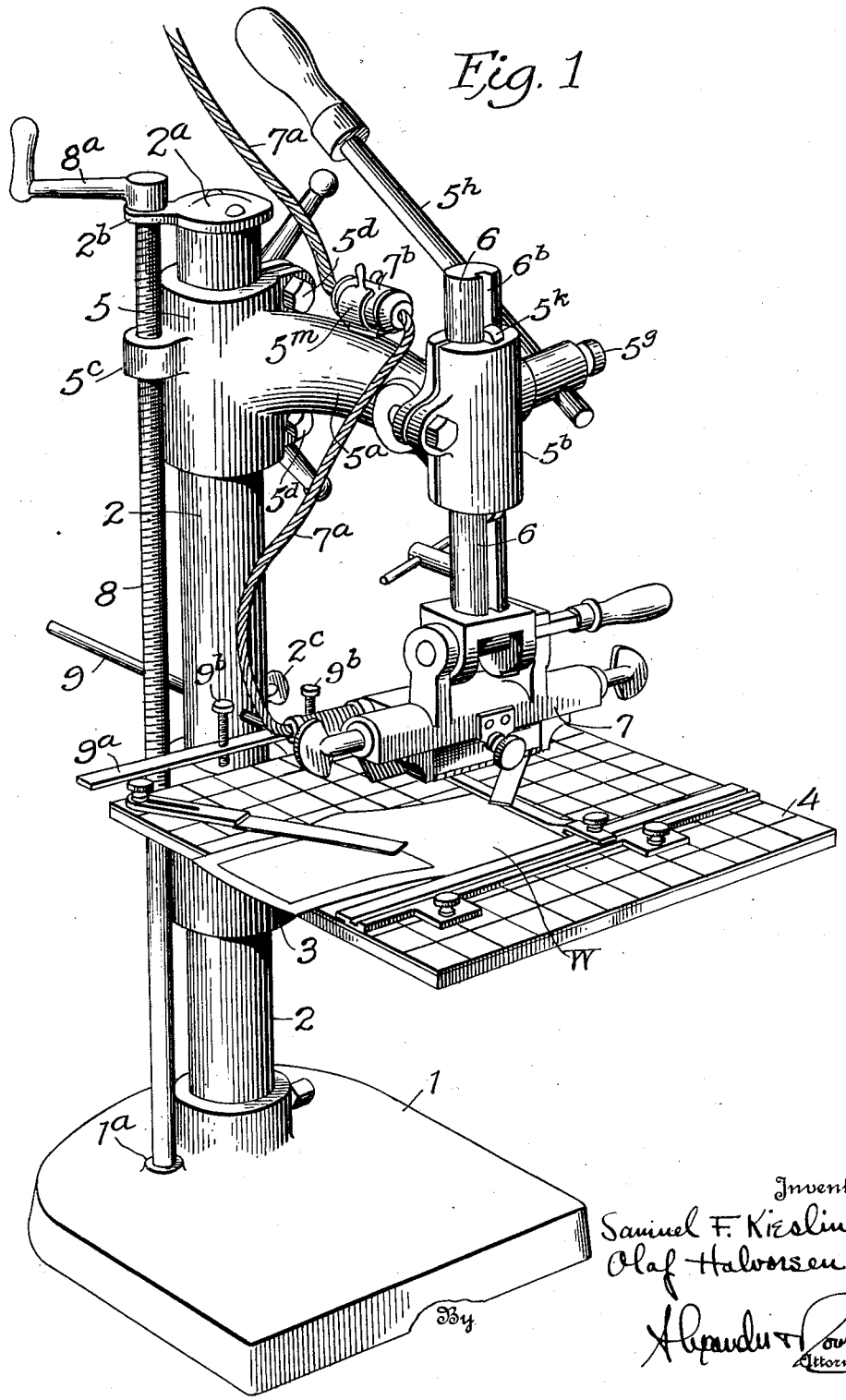
Fig. 1 is a perspective view of such machine showing our novel work holder applied thereto, also showing the "work" on the gauge board in position for receiving an impression from the die.

As shown in the drawings, the printing and embossing machine preferably comprises a base 1, having a standard 2, said standard having a table 3 conveniently mounted thereon adjacent its lower end adapted to carry the gauge board 4 as hereinafter explained.

Adjustably mounted on the upper end of standard 2 is a split head 5, having an arm $5^a$ extending therefrom and overlying the table 3 as shown. At the outer end of the arm $5^a$ is a split bearing $5^b$ carrying a plunger 6, the lower end of which carries the electrically heated printing die 7, which prints or embosses upon the work W held upon the table 3 or gauge board 4. Head 5 is preferably split, as shown, and provided with adjustable clamps $5^d$ of any desired type whereby head 5 may be contracted to bind in any adjusted position on the standard 2.

Extending parallel with the standard 2 and mounted in suitable bearings $1^a$ in base 1 and bearings $2^b$ in a cap $2^a$ on the upper end of standard 2, is a threaded rod 8 which passes through a tapped lug $5^c$ on the side of head 5. Rod 8 is provided with a crank $8^a$ at its upper end by which rod 8 may be rotated to raise or lower head 5 on standard 2, to allow for the insertion of articles of various thicknesses under the printing die 7.

Plunger 6 is provided with a rack $6^a$ opposite the arm $5^a$ which engages a pinion $5^e$ mounted in a recess $5^f$ in the adjacent end of arm $5^a$ communicating with the plunger bore in bearing $5^b$, said pinion $5^e$ being mounted on a stub shaft $5^g$ carrying a handle $5^h$ whereby as the handle is raised or lowered, the plunger 6 will be accordingly raised or lowered. Also plunger 6 is provided with a longitudinal keyway $6^b$ to receive a key $5^k$ in bearing $5^b$ to prevent plunger 6 from rotating in said bearing.

Die 7 is preferably constructed and arranged as shown in the above mentioned Letters Patent #1,452,421, and needs no particular description herein, said die being electrically heated by conductors $7^a$ which pass through a suitable switch $7^b$ mounted in a bracket $5^m$ on the arm $5^a$ as shown; the conductors $7^a$ being connected by means of a plug or the like (not shown) to an electrical socket. The construction thus far described is substantially the same as that set forth in the aforesaid patent.

In order to hold the "work" on table 3, when the gauge board 4 is not used, a spring rod 9 is provided adapted to overlie table 3, said rod passing through a bore in standard 2. A set screw $2^c$ tapped into the standard 2 is adapted to bind the rod 9 in adjusted position therein. At the outer end of rod 9 is a T-head 9ª having a plurality of vertically disposed screws 9ᵇ tapped therethrough, whereby by adjusting the screws 9ᵇ the head 9ª will force the "work" down upon the table 3 and hold same firmly in proper adjusted position under die 7.

For printing or embossing on relatively flat objects, our novel work holder is provided, consisting of a gauge board 4, preferably square or rectangular in shape, adapted to be bolted or otherwise removably secured upon the top of table 3. Gauge board 4 is preferably marked similarly to ordinary "plotting" paper, with two sets of evenly spaced orthogonal lines, extending at right angles to each other, the said lines being graduated from the center of the board 4 to each side thereon. The point of intersection of the two "zero" lines is preferably disposed in vertical alignment with the axis of plunger 6 and die 7.

Upon the top of board 4 is a scale bar 10 which may be clamped or otherwise secured in any adjusted position on the board by means of screws 10ª or the like passing through perforated ears 10ᵇ as shown and engaging holes 4ˣ in board 4. Scale bar 10 is provided with a longitudinal groove 10ᶜ in its upper face as shown, the lower outer edge of bar 10 being longitudinally recessed as at 10ᵈ to receive the head 11ᶜ of an adjustable arm 11 extending at right angles to bar 10. Scale bar 10 is preferably marked with graduations corresponding with the markings and letterings on gauge board 4.

Upon scale bar 10 is an adjustable arm 11, preferably bifurcated at its inner end as at 11ª, the lower leg 11ᵇ of the bifurcation being provided with a T-head 11ᶜ adapted to fit in and slidably engage the recess 10ᵈ in the under side of a scale bar 10 to maintain the arm 11 at right angles to scale bar 10. The upper leg 11ᵈ of bifurcation 11ª is provided with a set screw 11ᵉ adapted to engage the groove 10ᶜ on the upper face of scale bar 10, to lock arm 11 in adjusted position thereon.

Adjacent the inner corners of gauge board 4 are spring clamps 12 consisting of flat springs having longitudinal slots 12ª therein through which extend screws, bolts, or the like, 12ᵇ engaging board 4, whereby the clamps may be adjusted in any desired position on the board 4 to exert any desired downward pressure on the work W.

In operation, the work W is placed upon the gauge board 4 and centered under the die 7 by means of the graduations on said board. When so adjusted, the scale bar 10 is adjusted to the bottom edge of the work and secured to the board, and the adjustable arm 11 of scale bar 10 is adjusted to touch one side edge of the work, whereby if it is desired to print or emboss upon a plurality of articles of the same size, it is only necessary to place the articles successively on the board 10 with the two corners touching the scale bar 10 and the arm 11 and to engage the spring clamps 12 with the work as shown in Fig. 1, and by manipulating the handle 5ʰ, the die 7 may be depressed upon each article to impress the same lettering upon each article in the same relative location.

We do not consider our invention limited to the exact details shown in the drawings, for obviously changes may be made therein within the scope of the claims.

We claim:

1. For a machine having a movable die, a work holder comprising a gauge board adapted to be mounted in the path of said die, said board having evenly spaced coorthogonal lines marked thereon, the lines being graduated from the center of the board to each side thereof, and the point of intersection of the "zero" lines being disposed in alignment with the axis of the plunger; and a plurality of adjustable spring clamps on the gauge board.

2. A work holder of the character specified comprising a board; a plurality of adjustable spring clamps on said board; a bar adjustably mounted on said board, said bar having a longitudinal recess in its lower front edge; and an adjustable arm on said bar, said arm being bifurcated the lower leg of the bifurcation being provided with a T-head slidably engaging the longitudinal recess, and the upper leg of the bifurcation overlying the bar and being provided with means for clamping the bar between the legs.

3. A work holder of the character specified comprising a gauge board having evenly spaced coorthogonal lines marked thereon, a plurality of adjustable spring clamps on the gauge board; a scale bar adjustably mounted on said board and having graduations in its edge corresponding to the markings of the board; said bar having a longitudinal groove in its lower front edge; and an adjustable arm on said scale bar, said arm being bifurcated, the lower leg of the bifurcation being provided with a T-head slidably engaging the longitudinal recess, and the upper leg of the bifurcation overlying the bar being provided with means for clamping the bar between the legs.

4. A work holder of the character specified comprising a gauge board having evenly spaced coorthogonal lines marked thereon; a plurality of adjustable spring clamps on the gauge board; a scale bar adjustably mounted on said board, having graduations on its edge corresponding to the markings of the board; said bar having a longitudinal recess at its lower front edge; and an adjustable arm on said scale bar extending at right angles thereto, said arm being bifurcated, the lower leg of the bifurcation being provided with a T-head slidably engaging the longitudinal recess and the upper leg of the bifurcation overlying the bar being provided with set screw engaging the bar.

5. A work holder of the character specified comprising a gauge board having evenly spaced coorthogonal lines marked thereon, a plurality of adjustable spring clamps on the gauge board; and a scale bar adjustably mounted on said board, having graduations on its front edge corresponding to the markings of the board; said bar having a longitudinal groove in its upper face, and having a longitudinal recess at its lower front edge; and an adjustable arm on said scale bar extending at an angle thereto, said arm being bifurcated, the lower leg of the bifurcation being provided with a T-head slidably engaging the longitudinal recess, and the upper leg of the bifurcation overlying the bar being provided with set screws engaging the longitudinal groove.

6. In combination with a work holding board, a bar on said board having a longitudinal recess at its lower front edge; and an adjustable arm on said bar, said arm being bifurcated, the lower leg of the bifurcation being provided with a T-head slidably engaging the recess, and the upper leg of the bifurcation overlying the bar being provided with means for clamping the bar between the legs.

7. In combination with a work holding board, a scale bar having a longitudinal groove in its upper face, and having a longitudinal recess at its lower front edge; and an adjustable arm on said scale bar, said arm being bifurcated, the lower leg of the bifurcation being provided with a T-head slidably engaging the recess, and the upper leg of the bifurcation overlying the bar being provided with set screw engaging the groove.

8. In combination with a work holding board, a scale bar having graduations thereon, and having a longitudinal groove in its upper face, and having a longitudinal recess at its lower front edge; and an adjustable arm on said scale bar, said arm being bifurcated, the lower leg of the bifurcation being provided with a T-head slidably engaging the recess, and the upper leg of the bifurcation overlying the bar being provided with set screw engaging the longitudinal groove.

9. A scale bar having graduations marked thereon, having a longitudinal groove in its upper face, and having a longitudinal recess at its lower front edge; and an adjustable arm on said scale bar, extending at right angles thereto, said arm being bifurcated, the lower leg of the bifurcation being provided with a T-head slidably engaging the recess, and the upper leg of the bifurcation overlying the bar being provided with set screw engaging the groove.

10. A gauge board for presses having evenly spaced coorthogonal lines marked thereon, means for mounting said board on a press whereby the intersection of the middle lines of the coorthogonal lines may be disposed on the axis of the plunger of the press.

11. A gauge board for presses having evenly spaced coorthogonal lines marked thereon, means for mounting said board on a press whereby the intersection of the middle lines of the coorthogonal lines may be disposed on the axis of the plunger of the press, and means for holding work on said gauge board relative to said lines.

In testimony that we claim the foregoing as our own, we affix our signatures.

SAMUEL F. KIESLING.
OLAF HALVORSEN.